(12) United States Patent
Nugent (10) Patent No.: US 8,983,886 B2
(45) Date of Patent: Mar. 17, 2015

(54) SELF-EVOLVABLE LOGIC FABRIC

(75) Inventor: Alex Nugent, Santa Fe, NM (US)

(73) Assignee: Knowmtech, LLC, Albuquerque, NM (US)

( * ) Notice: Subject to any disclaimer, the term of this patent is extended or adjusted under 35 U.S.C. 154(b) by 311 days.

(21) Appl. No.: 13/602,797

(22) Filed: Sep. 4, 2012

(65) Prior Publication Data

US 2013/0258905 A1 Oct. 3, 2013

Related U.S. Application Data

(60) Provisional application No. 61/616,468, filed on Mar. 28, 2012.

(51) Int. Cl.
| | | |
|---|---|---|
| *G06N 5/00* | (2006.01) | |
| *G06F 1/00* | (2006.01) | |
| *G06F 15/16* | (2006.01) | |

(52) U.S. Cl.
CPC .................................... *G06F 15/16* (2013.01)
USPC .............................. 706/21; 707/749; 434/323

(58) Field of Classification Search
CPC ............. G06N 5/04; G06N 5/02; A61B 5/021
See application file for complete search history.

(56) References Cited

U.S. PATENT DOCUMENTS

| | | | |
|---|---|---|---|
| 5,794,224 | A | 8/1998 | Yufik |
| 6,889,216 | B2 | 5/2005 | Nugent |
| 6,995,649 | B2 | 2/2006 | Nugent |
| 6,996,758 | B1 | 2/2006 | Herron et al. |
| 7,028,017 | B2 | 4/2006 | Nugent |
| 7,039,619 | B2 | 5/2006 | Nugent |
| 7,107,252 | B2 | 9/2006 | Nugent |
| 7,392,230 | B2 | 6/2008 | Nugent |
| 7,398,259 | B2 | 7/2008 | Nugent |
| 7,409,375 | B2 | 8/2008 | Nugent |

(Continued)

FOREIGN PATENT DOCUMENTS

EP    1 483 737 81    3/2011

OTHER PUBLICATIONS

Ananthanarayanan, R. et al., "The Cat is Out of the Bag: Cortical Simulations with $10^9$ Neurons, $10^{13}$ Synapses," SC09 Nov. 14-20, 2009, Portland, Oregon, 12 pages.

(Continued)

*Primary Examiner* — Jeffrey A Gaffin
*Assistant Examiner* — Kalpana Bharadwaj
(74) *Attorney, Agent, or Firm* — Kermit D. Lopez; Luis M. Ortiz; Ortiz & Lopez, PLLC (57) ABSTRACT

Methods and systems for achieving self-organized growth of a logic pathway. A number of hardware modules that represents a core can be configured and communicated via a packet routing architecture. Each core includes a plurality of sub-modules that interact dynamically to a growth algorithm. A flow network can be created between a sensor input and a prediction of a desired sensor input and a link can be formed between a regularity within a core and another core via a link-flow-selection process. A digital data packet can be transmitted between the cores for communicating activation of the regularity and to exchange energy. Such physically-self organized circuit fabric system interacts dynamically to a growth algorithm that takes the input to produce a desired output and continuously self-repair and/or heal if damaged.

20 Claims, 4 Drawing Sheets

(56) References Cited

U.S. PATENT DOCUMENTS

| | | |
|---|---|---|
| 7,412,428 B2 | 8/2008 | Nugent |
| 7,420,396 B2 | 9/2008 | Nugent |
| 7,426,501 B2 | 9/2008 | Nugent |
| 7,502,769 B2 | 3/2009 | Nugent |
| 7,599,895 B2 | 10/2009 | Nugent |
| 7,752,151 B2 | 7/2010 | Nugent |
| 7,827,130 B2 | 11/2010 | Nugent |
| 7,827,131 B2 | 11/2010 | Nugent |
| 7,880,499 B2 | 2/2011 | Manohar et al. |
| 7,930,257 B2 | 4/2011 | Nugent |
| 8,022,732 B2 | 9/2011 | Nugent |
| 8,041,653 B2 | 10/2011 | Nugent |
| 2003/0217129 A1* | 11/2003 | Knittel et al. ........... 709/223 |
| 2009/0304436 A1 | 12/2009 | Brennan et al. |
| 2010/0286824 A1* | 11/2010 | Solomon ............... 700/248 |
| 2011/0031999 A1 | 2/2011 | Beat |
| 2011/0145179 A1 | 6/2011 | Nugent |
| 2011/0302119 A1* | 12/2011 | Nugent ................ 706/27 |
| 2012/0078827 A1 | 3/2012 | Nugent |
| 2012/0110411 A1 | 5/2012 | Cheung et al. |

OTHER PUBLICATIONS

Orders of magnitude (power)—Wikipedia, printed Aug. 28, 2012, 7 pages.

Zweifel, L. S. et al., "Functions and Mechanisms of Retrograde Neurotrophin Signalling," Neuroscience (2005) 6:615-625, August.

Yufik, Y. M., "Virtual Associative Networks: A Framework for Cognitive Modeling," Brian and Values: Is a Biological Science of Values Possible (1998) Lawrence Erlbaum Associates, Inc., Pribram, K. H. (ed.), Mahway, NJ, pp. 109-177.

Yufik, Y. M. et al., "Swiss Army Knife and Ockham's Razor: Modeling and Facilitating Operator's Comprehension in Complex Dynamic Tasks," IEEE Transactions on Systems, Man, and Cybernetics—Part A: Systems and Humans (2002) 32(2):185-199.

Yufik, Y. M., "How the Mind Works: An Exercise in Pragmatism," Inst. of Med. Cybern. Inc. (2002) Gaithersburg, MD, 5 pages.

* cited by examiner

SELF-EVOLVABLE LOGIC FABRIC

CROSS-REFERENCE TO PROVISIONAL APPLICATION

This application claims priority under 35 U.S.C. 119(e) to U.S. Provisional Patent Application Ser. No. 61/616,468, entitled "Self Evolvable Logic Fabric," which was filed on Mar. 28, 2012, the disclosure of which is incorporated herein by reference in its entirety.

TECHNICAL FIELD

Embodiments are generally related to self-evolvable control systems and methods. Embodiments are also related to self-organizing circuits. Embodiments are additionally related to attractor-based systems.

BACKGROUND OF THE INVENTION

A number of technological and economic barriers currently exist in the development of new types of electronic devices and systems. As devices approach the atomic scale, they become noisy and prone to faults in production and use. Opposite to the consumer trend of price reduction, the cost for producers to fulfill Moore's law is increasing dramatically. At the same time, however, it is also becoming increasingly clear that current computing approaches will not meet the challenges brought by adaptive autonomous controllers. The power-discrepancy between a biological solution and an advanced computing system is so large that it points to flaws in notions of computing.

Figure 1:
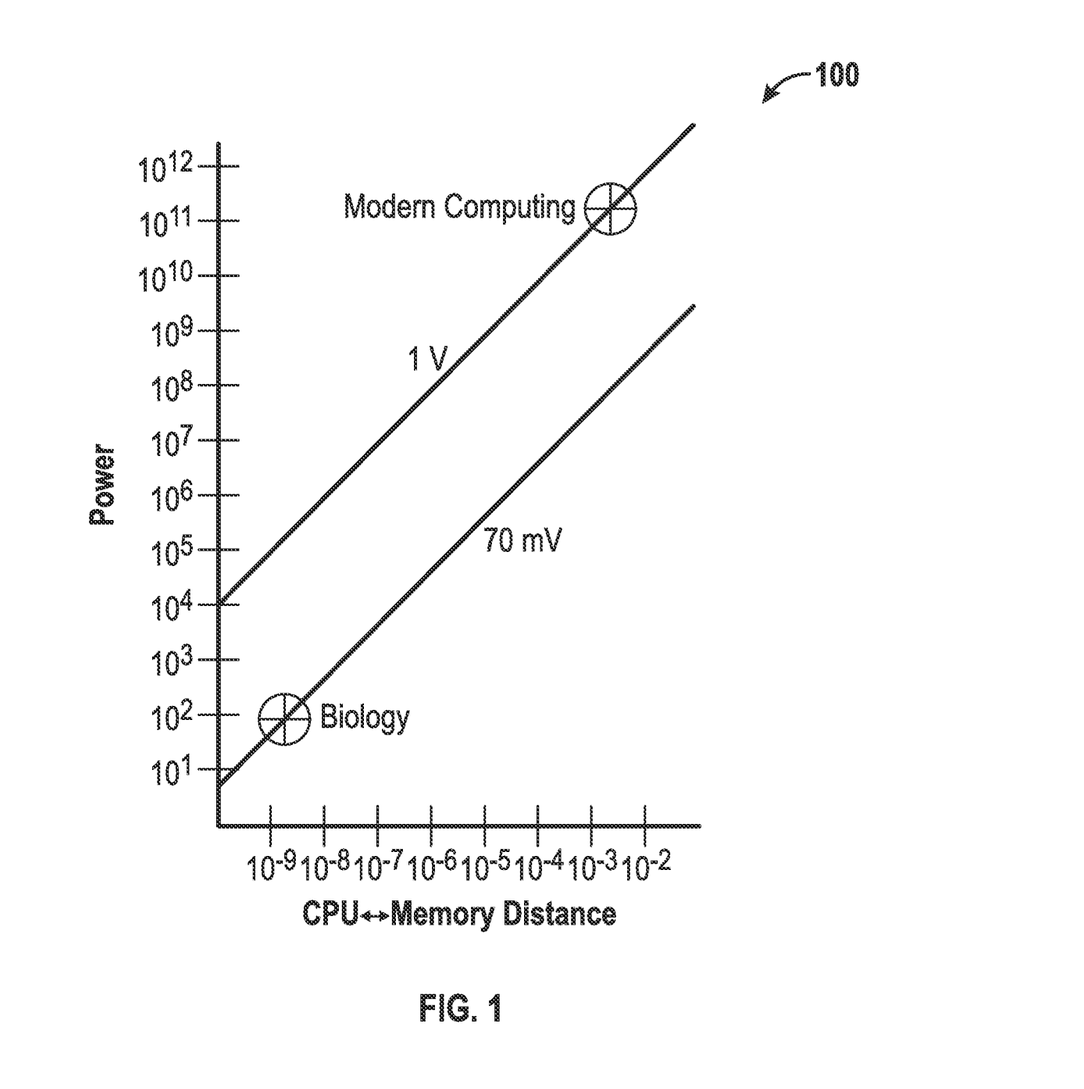
FIG. 1 illustrates a graph depicting power-discrepancy between a biological solution and an advanced computing system, in accordance with the disclosed embodiments.

FIG. 1 illustrates a graph 100 depicting power-discrepancy between biological solutions and advanced computing systems, in accordance with the disclosed embodiments. For example, consider a human body simulated at a moderate fidelity such that each cell of the body is allocated to one CPU and that the distance between a memory and a processor is distance d. At an operating voltage V=1 and d=1 cm, the simulation would consume at minimum 100 GW of power, or about the total peak power consumption of France in 2011. If the voltage is lowered to a thermodynamic limit of V=0.025V (kT at room temperature) and the CPU-memory distance to the diameter of an average cell, $d=10^{-5}$ m, it will still consume 62.5 kW, which is 625 times as much energy as is actually consumed by the human body. The distance between the CPU and memory must be at least 2 nm or less for the simulation to equal the efficiency of biology if the operating voltage is set to 70 mV, the resting potential of a neuron. The progromatic paradigm breaks down at such low voltages since the barrier energy between bit states becomes comparable to the thermal energy. For these reason, it's relatively clear that a new type of computing system based on self-organization of nature must be created. While some point to quantum computing as a potential solution, it must be noted that the extreme isolations required to maintain a qubit in its superposition state are at odds with the solution which has clearly been found by life, which is heavily integrated with its environment and operates in extremely volatile conditions. What is needed is a solution based more on the self-repairing and self-assembling properties of life while still integrating with modern electronics.

Nature is capable of building structures of far greater complexity than any modern chip and it is capable of doing it while embedded in the real world. If the principles of autonomous self-organization are illuminated, it can cascade through all parts of world economy. Self organizing circuits can dramatically reduce the cost of fabrication by increasing yields as the circuits can adapt around faults. Any application that must interact with a complex changing environment is a potential platform for the self-organizing autonomous control circuitry. The ability to heal, a natural consequence of an attractor-based self-organization, leads to enhanced survival in hostile environments.

Based on the foregoing, it is believed that a need exists for an improved system and method for achieving self organized growth of a logic and/or algorithmic pathways. A need also exists for an improved physically-self-organized circuit fabric system that interacts dynamically to growth algorithms and continuously self-repairs if damaged, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved self-evolvable control system and method.

It is another aspect of the disclosed embodiments to provide for an improved system and method for achieving self-organized growth of logic pathways.

It is yet another aspect of the disclosed embodiments to provide for an improved self evolvable logic fabric system that is capable of self repair and/or heal if damaged.

The aforementioned aspects and other objectives and advantages can now be achieved as described herein. A system and method for achieving self-organized growth of logic pathways is disclosed herein. A number of hardware modules that represent a core can be configured and communicate via a packet routing architecture. Each core includes a number of sub-modules that interact dynamically to growth algorithms. A flow network can be created between inputs via a link-flow-selection process. A digital data packet can be transmitted between the cores for communicating activation of the regularity and to exchange energy tokens. Such physically self-organized circuit fabric system interacts dynamically to grow algorithms that maximize the flow of its energy token.

An input packet can be received via an input packet receive module. Packets may be transmitted directly to an input packet return module or dropped. From the input packet receive module, packets are mapped to a content addressable memory module (CAM). The function of the CAM is to assign the source packets address with one of a limited number of input lines. This may be accomplished with CAM's least-recently used caches, least-frequency used caches, or other methods which differ in their strategy in allocated lines to new input address should the line address space fill up. Thus, a sender's address can be mapped to a dedicated input line on a pattern register and a bit matching can be performed between the sender's address and an internally stored bit pattern. In addition to the methods listed above, an existing entry can be overwritten such that a least-energy-dissipating link is over-written first when a new input address is present. This is determined by the flow of the energy token through the network, as will be discussed.

The pattern can be presented to a regularity detector once all input packets arrive. A regularity ID from the regularity detector can be represented as a bit pattern and the regularity ID can be transmitted as input to a thermodynamic random access memory (kRAM). The function of the kRAM is to store information related to the regularities energy and its link structure and link weights to other cores. Each link represents an address to another core within the network. A link address from the kRAM can be transmitted to an output packet send module to generate and transmit the packet to an address specified in the kRAM. The address specified by the kRAM may be programmed by a user or else evolve thermodynamically. If set to evolve thermodynamically, the stability of the bit patterns is given by the total energy tokens flowing through the link. The total energy allocated to each address in the kRAM is given by the kRAM's link weights. As more of the energy token flows through the link, it becomes stronger. Thus, one can view a kRAM as a self-organizing routing module that is attempting to maximize the total flow of energy tokens.

An output packet return module that includes information regarding the energy accepted from the down-stream regularity can receive a return packet. The information can then be provided to the kRAM in order to apply feedback in proportion to an amount of energy that is dissipated though the respective link. The regularities energy can be communicated to an input packet return module in order to calculate energy the regularity is capable of sinking for each active input regularity and communicate the energy via a return packet. The kRAM module comprises a collection of thermodynamic bits, which change state with an increased probability in the absence of an externally applied feedback signal and stabilize in the presence of a feedback signal. The feedback signal is generated when the energy tokens are dissipated (i.e. accepted) through a link. That is, when a packet is sent to the address specified in the kRAM module it contains some amount of energy. If this energy is accepted, a return packet is sent specifying how much energy was accepted (dissipated). The feedback is thus proportionally to the dissipated or accepted energy.

The energy can be represented as a digital and/or analog signal and the energy can be accounted via a symbolic mechanism of an arithmetic operator. The energy can be represented in a pulse timing manner so that a pulse that arrives first possess more energy and the pulse that arrives later possess less energy, relative to some global phase or clock signal. The energy can be deleted from the network when desired events occur. A negative energy value can suffice as a sink if the energy is represented as a symbolic number. Such a technique may thus be used to direct energy sinks to specific cores or regularities within cores. In this manner, each core is attempting to recognize the regularities present on its inputs while evolving links to maximize the dissipation of energy. The resulting network of regularities linked by energy flow thus represents an algorithm or logic path that convert inputs into desired outputs.

A number of embodiments, preferred and alternative, are disclosed herein. For example, in one embodiment, a method for the self-organized growth of at least one logic pathway can be implemented. Such a method may include, for example, the steps or logical operations of communicating a plurality of cores via a packet routing architecture, wherein at least one core includes sub-modules that interact dynamically with one another forming a link between a regularity within the at least one core and at least one other core via a link-flow-selection process, and transmitting a digital data packet between the at least one core and the at least one other core to communicate an activation of the regularity and to exchange energy to thereby grow the at least one logic pathway in a self-organized manner. In another embodiment, the plurality of hardware cores can represent the at least one core. In another embodiment, the sub-modules can interact to evolve the logic pathway. In still another embodiment, a step or logical operation can be implemented for creating a flow network between a sensor input and a sink event. In yet another embodiment, the sink event can constitute a prediction of the sensor input.

In another embodiment, steps of logical operations can be implemented for receiving at least one input packet via an input packet receive module; transmitting the at least one packet to a thermodynamic content addressable memory module; mapping a sender address to a dedicated input line on a pattern register; performing a bit-matching between the sender address and an internally stored bit pattern; and overwriting an existing entry such that a least-energy-dissipating link is over-written first when a new input address is present.

In yet another embodiment, steps or logical operations can be implemented for presenting the internally stored bit patter to a regularity detector once all input packets are arrived; representing a regularity ID from the regularity detector as a bit pattern; and transmitting the regularity ID as an input to a thermodynamic random access memory in order to retrieve information related to the regularity energy and links, wherein each link represent an address to the at least one other core within the network.

In still another embodiment, steps or logical operations can be implemented for sending a link address and energy from the thermodynamic random access memory to an output packet send module; generating and transmitting the packet to a core address specified in the thermodynamic random access memory; receiving a return packet by an output packet return module that includes information regarding the energy accepted from the regularity; providing the information to the thermodynamic random access memory in order to apply feedback in proportion to an amount of energy that is accepted by receiving core; communicating the regularity energy to an input packet return module in order to calculate an amount of energy that the regularity is capable of sinking for each active input regularity; and communicating the energy via a return packet.

In another embodiment the thermodynamic random access memory can include core addresses and a regularity energy level. In other embodiments, the thermodynamic random access memory can include a plurality of thermodynamic bits which flip state randomly with an increased probability in absence of an externally applied feedback signal and which stabilize in presence of the feedback signal.

In yet another embodiment, a hardware structure can be configured, which includes multiple cores, wherein each core among the multiple cores comprises functionalities of regularity extraction and link-flow-selection between regularities, wherein a function of the hardware structure is to evolve energy-dissipating pathways between the regularities. In another embodiment, such energy can be represented as a digital token or a number. In other embodiments, the aforementioned link-flow-selection can be provided by: linking a sending regularity with at least one receiving regularity with variable-strength links, each link comprising a link address and a strength; and allocating energy from the sending regularity to the at least one receiving regularity in proportion to link strengths.

In other embodiments, the link address can be represented as volatile bits such that an absence of energetic feedback causes the volatile bits to reconfigure a state and an application of the energetic feedback reduces a probability of state reconfiguration. In some embodiments, the energy accepted by a receiving regularity can be associated with a stabilizing feedback to volatile links of the sending regularity.

In another embodiment, a system for the self-organized growth of at least one logic pathway can be implemented. Such system can include, for example, a plurality of cores capable of being communicated via a packet routing architecture, wherein at least one core includes sub-modules that interact dynamically with one another; a link formed between a regularity within the at least one core and at least one other core via a link-flow-selection process; and transmission means for transmitting a digital data packet between the at least one core and the at least one other core to communicate an activation of the regularity and to exchange energy to thereby grow the at least one logic pathway in a self-organized manner. In some embodiments, the plurality of hardware cores is capable of representing the at least one core. In other embodiments, the sub-modules can interact to evolve a logic pathway. In yet other embodiments, such a system can further include a flow network created between a sensor input and a sink event. In still other embodiments, the sink event can comprise a prediction of the sensor input.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium.

Figure 2:
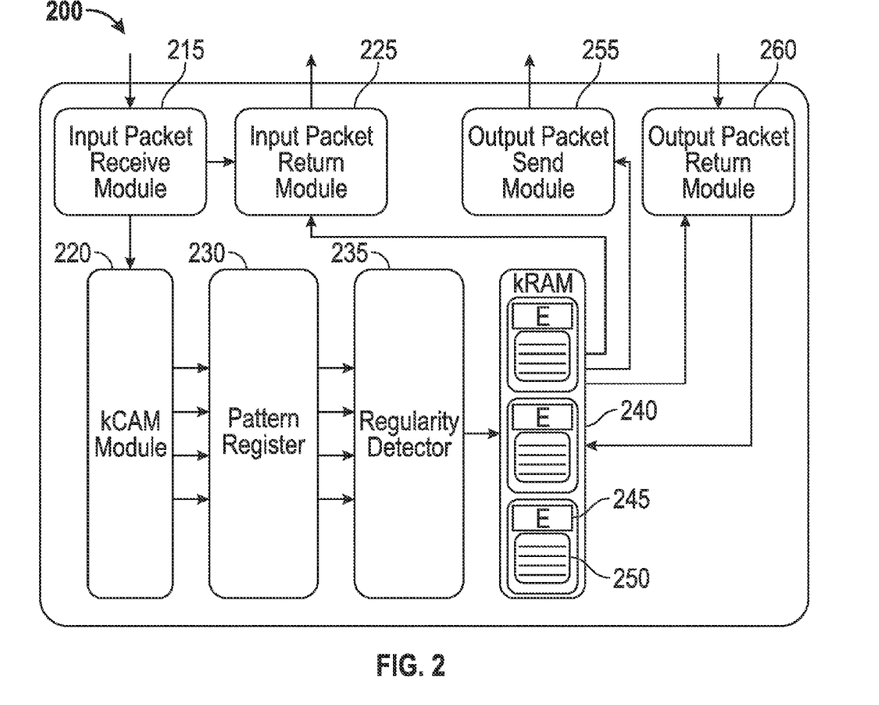
FIG. 2 illustrates a block diagram of a self-evolvable logic fabric core, in accordance with the disclosed embodiments.

FIG. 2 illustrates a block diagram of a self-evolvable logic fabric system core 200, in accordance with the disclosed embodiments. The core 200 interacts dynamically with other cores to grow algorithms. The core 200 can be configured to include a number of hardware modules such as, for example, an input packet receive module 215, an input packet return module 225, an output packet send module 255, and an output packet return module 260. The self-evolvable logic fabric system composed of many instances of core 200 further includes a thermodynamic content addressable memory (kCAM) module 220, a pattern register 230, a regularity detector 235, and a thermodynamic random access memory (kRAM) module 240.

The input packet receive module 215 receives an input packet and transmits each packet to the thermodynamic content addressable memory module 220. In some cases it may send the packet directly to the input packet return module, for example, if the packet is rejected. Content-addressable memory (CAM) is a special type of computer memory employed in certain very high speed searching applications. In this use, its function is to map the input packets source address to input lines. This function may also be accomplished with other methods, for example, a Least-Recently-Used Cache, Least-Frequently-Used-Cache, etc. In each case, the relevant difference concerns which address space is over-written when maximum capacity is reached. One strategy for over-writing memory may be based on the total energy token dissipation or flow occurring over the link such that high-flow links are kept and low-flow connections are over-written. The pattern register 230 functions to serialize the active inputs arriving from the kCAM such that a parallel pattern may be presented to the regularity detector 235.

The regularity detector 235 receives the input pattern from the pattern register. The regularity detector 235 generates a regularity ID that can be represented as a bit pattern and transmits the regularity ID as input to the thermodynamic random access memory module 240, which stores information related to the regularities energy 245 and its links 250. Links 250 represents addresses to other cores within the network as well as the total energy to allocate in each direction. One can thus see a link as a bit vector such that the state of the bits encode the address and the magnitude of the bit-vector encodes the relative energy to allocate to the links address, relative to the other links. Alternately, the links address may be programmed or set by the user of the system and the link weights evolve. Should the total energy in a regularity level fall below some threshold, packet propagation is terminated.

The output packet send module 255 can receive a link address and energy token value from the kRAM module 240 to generate and transmit the packet to the address specified. The output packet return module 260 receives a return packet that includes information regarding the energy 245 accepted from the regularity. The information can then be provided to the thermodynamic random access memory (kRAM) module 240 in order to apply feedback in proportion to an amount of energy 245 that is dissipated.

kT-RAM is a memory architecture that may be composed of thermodynamic bits. A thermodynamic bit is a bit with a variable mutation rate that can be set by applied feedback. As more feedback is applied, the probability that the bit can flip states in a unit of time goes to zero. Thus, the kRAM 240 is a constantly mutating access memory if the feedback is withheld from all bits. In the case where feedback is provided to all bits, it becomes a traditional ROM. A significant difference between kRAM 240 and normal RAM is that kRAM 240 is not written by a user but rather configures its own state through random thermal fluctuations and is later stabilized by feedback. That is, absent feedback a thermodynamic bit will randomly flip states until feedback arrives.

The kRAM 240 can be constructed of arrays of AHaH nodes, which encode the bit state on a differential pair of memristive devices. The kRAM 240 includes a collection of thermodynamic bits which flip their state randomly with an increased probability in the absence of an externally applied feedback signal and which stabilize in the presence of the feedback signal. This can be accomplished through many mechanisms. The external feedback signal for each link 250 within the kRAM 240 represents the energy that the link is responsible for dissipating. As the link routes packets to destinations that accept its energy, it will receive more feedback and stabilize. The input packet return module 225 receives the regularities energy 245 to in order to calculate the energy 245 the regularity is capable of sinking for each active input regularity and communicate the energy 245 via a return packet.

In an alternate embodiment, the kRAM may act to evolve the link weights while the link address are programmed by a user. In this embodiment, each link maintains a weight that governs how much energy is allocated to each destination address, relative to other links. In this manner, the general link topology of the core network is specified by the user of the system, while a sub-network is selected by the kRAM so as to maximize the energy flow within the network.

Figure 3:
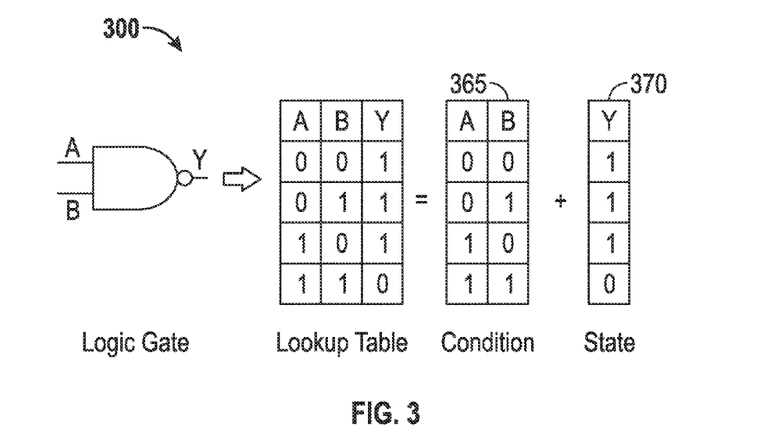
FIG. 3 illustrates a schematic view of a logic function composed of two components, in accordance with the disclosed embodiments.

FIG. 3 illustrates a schematic view of a logic function 300 composed of two components 365 and 370, in accordance with the disclosed embodiments. Modern computing is based on the concept of intrinsic logic, which is to say that the logic function of a circuit is intrinsic to the circuit itself. By connecting transistors or other electronic elements in certain configurations, logic functions of any type can be formed. Intrinsic logic is defined not by the circuit, but rather by the structure of the information that the circuit is processing. Logic functions are attractor states of a feedback circuit operating on internal modifiable weights and governed by the structure of the information being processed. For example, consider the NAND logic gate represented as a lookup-table, as shown in FIG. 3. Two inputs A and B produce an output Y. The logic function 300 first recognizes the condition 365 and the logic gate will produce an output 370 for a given condition. This intrinsic assumption of condition is at the core of modern digital logic, but it is fundamentally at odds with self-organizing logic structures operating on natural data streams. One major problem with extrinsic logic is dimensionality. Although many inputs may be present, the actual information content is much lower than the maximal carrying capacity. That is to say, there are many less conditions than what could theoretically be carried over the wires or inputs.

Extrinsic attractors are most suitable for information-processing systems. An example of the extrinsic attractor is the brain. The structure of the brain is a reflection of the structure of the information it is processing, as evidence by the fact that ones decision are based on prior experiences or memories. Another example of an extrinsic attractor is a fast-flowing river. The structure of the rapids can be created from the water flowing over the streambed. Countless molecules of water come and go, but the structure of the rapids remain the same. Without the underlying structure of the stream-bed or the energy dissipation brought on by the gravitational gradient, the structure will quickly dissipate. Three ingredients are necessary for the extrinsic attractor. First, energy must be dissipated. In the river, this can be provided by a gravitational gradient. Second, the water must interact with itself and the environment (the stream bed) according to a plasticity rule. In the river, the inter-molecular forces of water can provide this. Third, there must be external structure, for example, the rocks and boulders of the streambed. In the case of extrinsic logic, the external structure is that of the information, the energy source is the electric potential, and the interaction rule is the AHaH rule.

Figure 4:
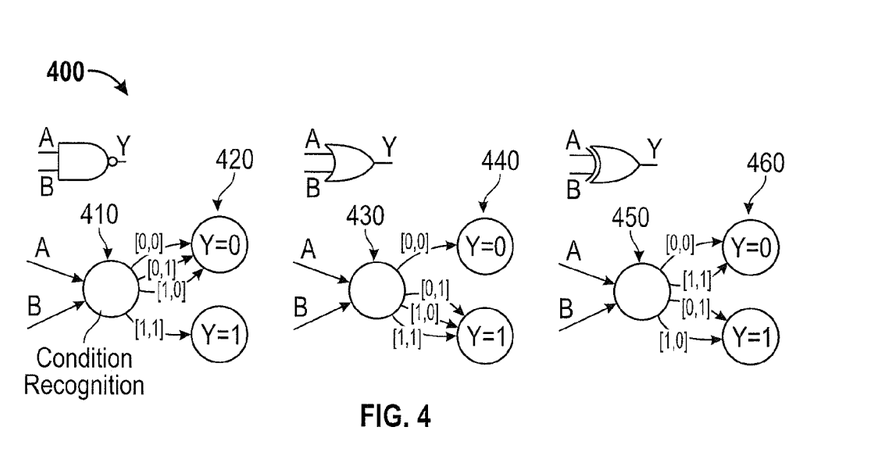
FIG. 4 illustrates a schematic view of logic functions represented as finite-state-machines, where a first state recognizes a condition and the transitions to a new state represent a logic function, in accordance with the disclosed embodiments.

FIG. 4 illustrates a schematic view of logic functions 400 represented as finite-state-machines, where a first state 410, 430, and 450 recognizes a condition and transitions to a new state 420, 440, and 460. This two-phase process represents a logic function, in accordance with the disclosed embodiments. A logic function can be broken into two components related to the detection of condition and the output of state. The NAND, OR, XOR or any other logic functions can be represented as finite-state-machines (FSM) with three states, as shown in FIG. 4. The first state 410, 430, and 450 determines the condition of the inputs. Depending on the condition, the machine transitions to new states 420, 440, and 460 representing the output. Note that the logic function can be obtained through a link structure in the FSM and that the first state, the condition recognition, is the same for all. Stated another way, the recognition of a condition is the recognition of a data regularity.

Figure 5:
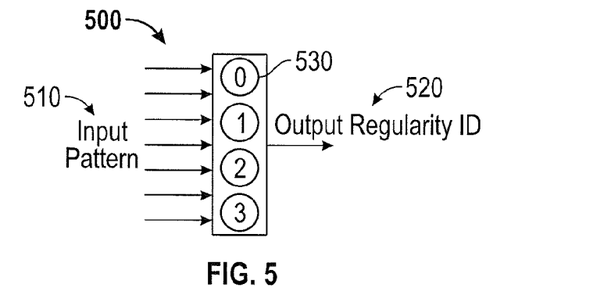
FIG. 5 illustrates a schematic view of a regularity detector that converts an input pattern to a regularity ID, in accordance with the disclosed embodiments.
Figure 6:
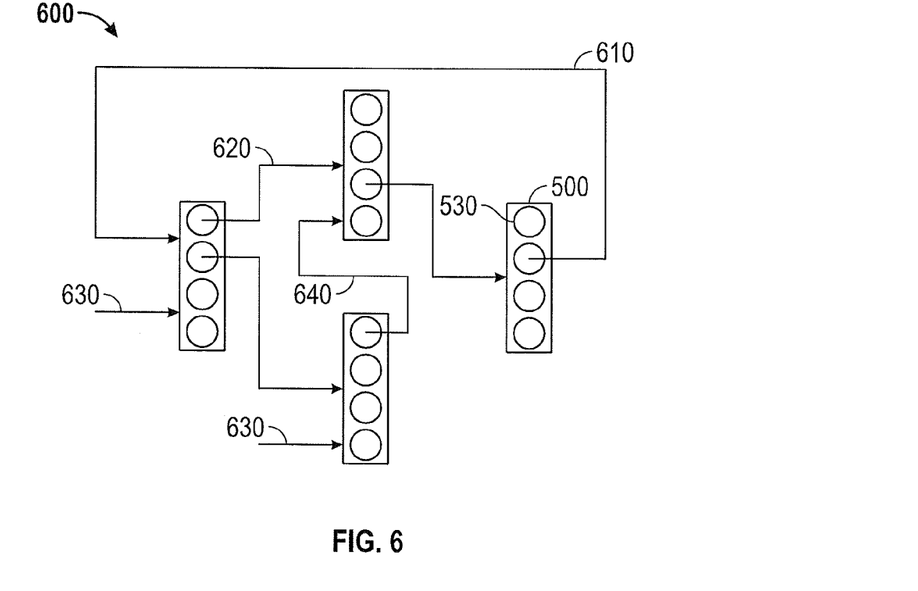
FIG. 6 illustrates a schematic view of a network of cores that links regularities within cores to other cores, in accordance with the disclosed embodiments.

FIG. 5 illustrates a schematic view of a regularity extraction module 500 that converts an input pattern 510 to regularity ID 520, in accordance with the disclosed embodiments. The system 200 evolves the link structure 250 that links regularities 530 to cores 600, as seen in FIG. 6. The links 250 can be evolved through a process of link-flow-selection. FIG. 6 illustrates a schematic view of a core network 600 that links the regularities 530 within the cores to other cores, in accordance with the disclosed embodiments. The logic functions can are represented as finite-state-machine in which one state acts as the regularity detector 235 and the links 250 to other states represent the logic output. Collectives of AHAH (Anti-Hebbian and Hebbian) node may act as the regularity detectors 235 detailed in other disclosures. The link 250 can be first randomly created between the regularity 530 within a core and another core. Should the regularity 530 be active within the core 500, energy 245 can be transferred between the regularity 530 and the regularity of the receiving core 500. When desired events occur, energy may be sunk. Since link structure is stabilized via energy flow (i.e., link-flow selection), the network of regularities which emerges represents an evolved logic pathway or algorithm.

In general, Hebbian theory is a scientific theory in biological neuroscience which explains the adaptation of neurons in the brain during the learning process. It describes a basic mechanism for synaptic plasticity wherein an increase in synaptic efficacy arises from the presynaptic cells repeated and persistent stimulation of the postsynaptic cell. In neuroethology and the study of learning, anti-Hebbian learning describes a particular class of learning rule by which synaptic plasticity can be controlled. These rules are based on a reversal of Hebb's postulate and therefore can be simplistically understood as dictating reduction of the strength of synaptic connectivity between neurons following a scenario in which a neuron directly contributes to production of an action potential in another neuron.

The energy flow network 600 can be built of numerous connections, for example, a top-down process 610, a feed forward process 620, and a lateral process 640. Sensory inputs 630 may be energy sources and desired outputs may be sinks, or visa versa. It is required that the user specify energy sources and sinks such that network structure may emerge. It can be appreciated that although the network 600 may possess some set capacity in the amount of energy it can store within its nodes, the only way the network 600 can achieve constant flow of energy from the sources to sinks is to evolve algorithmic structure necessary to sink the energy.

Figure 7:
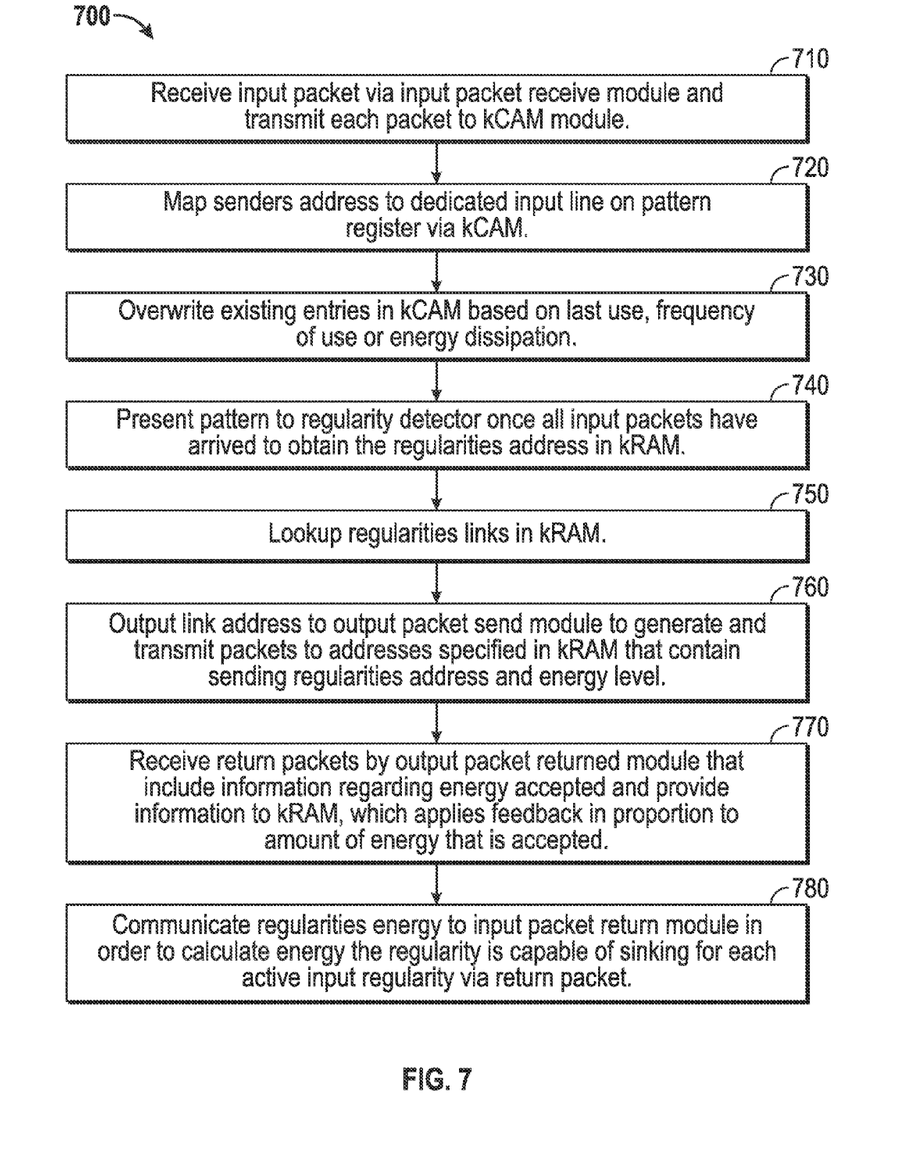
FIG. 7 illustrates a high level flow chart of operations illustrating logical operational steps of a core for achieving self-organized growth of a logic pathways within a network of cores, in accordance with the disclosed embodiments.

FIG. 7 illustrates a high level flow chart of operation illustrating logical operational steps of a method 700 for achieving self-organized growth of a logic pathway, in accordance with the disclosed embodiments. Initially, input packets can be received via, for example, the input packet receive module 215 discussed earlier, and each packet can be transmitted to, for example, the thermodynamic content addressable memory (kCAM) module 220, as indicated at block 710. Next, as described at block 720, the thermodynamic content addressable memory module 220 can map the sender's address to a dedicated input line on the pattern register 230. Existing maping between senders address and input lines can be overwritten in a number of ways as depicted at block 730, for example, least frequently used, last-used or least energy dissipating.

Once all input packets for a set time period or clock have arrived and the thermodynamic content addressable memory module 220 has translated them to input lines on the pattern register 230, the pattern can be presented to the regularity detector 235, as illustrated at block 740. The output of the regularity detector 235 can constitute a regularity ID which can be represented, for example, as a bit pattern. The regularity ID can be input to the thermodynamic random access memory module 240, which serves to store information related to the regularities energy 245 and links 250. As indicated next at block 750, an operation can be implemented for looking up regularity or regularities' links in the kRAM.

The thermodynamic random access memory module 240 outputs the link address and regularity energy to the output packet send module 255 to generate and transmit packets to the addresses specified in the thermodynamic random access memory module 240, as depicted at block 760. The return packets can be received in the output packet return module 260 that includes information regarding how much energy is accepted and from what regularity. This information can be provided to the thermodynamic random access memory module 240, which applies feedback in proportion to the amount of energy that was accepted, as depicted at block 770.

The energy 245 can be communicated to the input packet return module 225, which calculates how much energy the regularity is capable of sinking for each active input regularity and communicates this through a return packet to facilitate the same feedback to the regularities that project to the core, as shown at block 780. The system 200 constructs a network of regularities through the operation of the cores 200 on input patterns 510. The flow network 600 can be created between the sensor inputs 630 and desired sink events. Should sink event occur, the energy 245 can be deleted or otherwise removed from the network. If energy 245 is represented as symbolic numbers, negative energy values can suffice as a sink.

Based on the foregoing, it can be appreciated that a number of embodiments, preferred or alternative, are disclosed herein. For example, in one embodiment, a method for the self-organized growth of at least one logic pathway can be implemented. Such a method may include, for example, the steps or logical operations of communicating a plurality of cores via a packet routing architecture, wherein at least one core includes sub-modules that interact dynamically with one another, forming a link between a regularity within the at least one core and at least one other core via a link-flow-selection process, and transmitting a digital data packet between the at least one core and the at least one other core to communicate an activation of the regularity and to exchange energy to thereby grow the at least one logic pathway in a self-organized manner. In another embodiment, the plurality of hardware cores can represent the at least one core. In another embodiment, the sub-modules can interact to evolve the logic pathway. In still another embodiment, a step or logical operation can be implemented for creating a flow network between a sensor input and a sink event. In yet another embodiment, the sink event can constitute a prediction of the sensor input.

In another embodiment, steps of logical operations can be implemented for receiving at least one input packet via an input packet receive module; transmitting the at least one packet to a thermodynamic content addressable memory module; mapping a sender address to a dedicated input line on a pattern register; performing a bit-matching between the sender address and an internally stored bit pattern; and overwriting an existing entry such that a least-energy-dissipating link is over-written first when a new input address is present.

In yet another embodiment, steps or logical operations can be implemented for presenting the internally stored bit pattern to a regularity detector once all input packets are arrived; representing a regularity ID from the regularity detector as a bit pattern; and transmitting the regularity ID as an input to a thermodynamic random access memory in order to retrieve information related to the regularity energy and links, wherein each link represent an address to the at least one other core within the network.

In still another embodiment, steps or logical operations can be implemented for sending a link address and energy from the thermodynamic random access memory to an output packet send module; generating and transmitting the packet to a core address specified in the thermodynamic random access memory; receiving a return packet by an output packet return module that includes information regarding the energy accepted from the regularity; providing the information to the thermodynamic random access memory in order to apply feedback in proportion to an amount of energy that is accepted by reviewing core; communicating the regularity energy to an input packet return module in order to calculate an amount of energy that the regularity is capable of sinking for each active input regularity; and communicating the energy via a return packet.

In another embodiment the thermodynamic random access memory can include core addresses and a regularity energy level. In other embodiments, the thermodynamic random access memory can include a plurality of thermodynamic bits which flip state randomly with an increased probability in absence of an externally applied feedback signal and which stabilize in presence of the feedback signal.

In yet another embodiment, a hardware structure can be configured, which includes multiple cores, wherein each core among the multiple cores comprises functionalities of regularity extraction and link-flow-selection between regularities, wherein a function of the hardware structure is to evolve energy-dissipating pathways between the regularities. In another embodiment, such energy can be represented as a digital token or a number. In other embodiments, the aforementioned link-flow-selection can be provided by: linking a sending regularity with at least one receiving regularity with variable-strength links, each link comprising a link address and a strength; and allocating energy from the sending regularity to the at least one receiving regularity in proportion to link strengths.

In other embodiments, the link address can be represented as volatile bits such that an absence of energetic feedback causes the volatile bits to reconfigure a state and an application of the energetic feedback reduces a probability of state reconfiguration. In some embodiments, the energy accepted by a receiving regularity can be associated with a stabilizing feedback to volatile links of the sending regularity.

In another embodiment, a system for the self-organized growth of at least one logic pathway can be implemented. Such system can include, for example, a plurality of cores capable of being communicated via a packet routing architecture, wherein at least one core includes sub-modules that interact dynamically with one another; a link formed between a regularity within the at least one core and at least one other core via a link-flow-selection process; and transmission means for transmitting a digital data packet between the at least one core and the at least one other core to communicate an activation of the regularity and to exchange energy to thereby grow the at least one logic pathway in a self-organized manner. In some embodiments, the plurality of hardware cores is capable of representing the at least one core. In other embodiments, the sub-modules can interact to evolve a logic pathway. In yet other embodiments, such a system can further include a flow network created between a sensor input and a sink event. In still other embodiments, the sink event can comprise a prediction of the sensor input.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for the self-organized growth of at least one logic pathway, said method comprising:
   communicating a plurality of cores via a packet routing architecture, wherein at least one core includes sub-modules that interact dynamically with one another;
   forming a link between a regularity within said at least one core and at least one other core via a link-flow-selection process;
   transmitting a digital data packet between said at least one core and at least one other core to communicate an activation of said regularity and to exchange energy to thereby grow said at least one logic pathway in a self-organized manner;
   receiving at least one input packet via an input packet receive module;
   transmitting said at least one packet to a thermodynamic content addressable memory module;
   mapping a sender address to a dedicated input line on a pattern register;
   performing a bit-matching between said sender address and an internally stored bit pattern; and
   overwriting an existing entry such that a least-enemy-dissipating link is over-written first when a new input address is present.

2. The method of claim 1 further comprising configuring said plurality of hardware cores to represent said at least one core.

3. The method of claim 1 wherein said sub-modules interact to evolve said at least one logic pathway.

4. The method of claim 1 further comprising creating a flow network between a senor input and a sink event.

5. The method of claim 4 wherein said sink event comprises a prediction of said sensor input.

6. The method of claim 4 further comprising:
   presenting said internally stored bit pattern to a regularity detector once all input packets are arrived;
   representing a regularity ID from said regularity detector as a bit pattern; and
   transmitting said regularity ID as an input to a thermodynamic random access memory, in order to retrieve information related to said regularity energy and links, wherein each link represent an address to said at least one other core within said network.

7. The method of claim 6 further comprising:
   sending a link address and energy from said thermodynamic random access memory to an output packet send module;
   generating and transmitting said packet to a core address specified in said thermodynamic random access memory;
   receiving a return packet by an output packet return module that includes information regarding said energy accepted from said regularity;
   providing said information to said thermodynamic random access memory in order to apply feedback in proportion to an amount of energy that is accepted by revieving core;
   communicating said regularity energy to an input packet return module in order to calculate an amount of energy that said regularity is capable of sinking for each active input regularity; and
   communicating said energy via a return packet.

8. The method of claim 1 wherein said thermodynamic random access memory comprises core addresses and regularity energy level.

9. The method of claim 1 wherein said thermodynamic random access memory comprises a plurality of thermodynamic bits which flip state randomly with an increased probability in absence of an externally applied feedback signal and which stabilize in presence of said feedback signal.

10. A hardware structure, comprising:
    multiple cores, wherein each core among said multiple cores comprises functionalities of regularity extraction and link-flow-selection between regularities, wherein a function of said hardware structure is to evolve energy-dissipating pathways between said regularities.

11. The hardware structure claim of 10 wherein said energy is represented as a digital token or a number.

12. The hardware structure of claim 10 wherein said link-flow-selection is provided by:

linking a sending regularity with at least one receiving regularity with variable-strength links, each link comprising a link address and a strength; and allocating energy from said sending regularity to said at least one receiving regularity in proportion to link strengths.

13. The hardware structure of claim 12 wherein said link address is represented as volatile bits such that an absence of energetic feedback causes said volatile bits to reconfigure a state and an application of said energetic feedback reduces a probability of state reconfiguration.

14. The method of 13 wherein energy accepted by a receiving regularity is associated with a stabilizing feedback to volatile links of said sending regularity.

15. A system for the self-organized growth of at least one logic pathway, said system comprising:

a plurality of cores capable of being communicated via a packet routing architecture, wherein at least one core includes sub-modules that interact dynamically with one another;

a link formed between a regularity within said at least one core and at least one other core via a link-flow-selection process; and transmission means for transmitting a digital data packet between said at least one core and said at least one other core to communicate an activation of said regularity and to exchange energy to thereby grow said at least one logic pathway in a self-organized manner an input packet receive module wherein at least one input packet received via said input packet receive module;

transmitting said at least one packet to a thermodynamic content addressable memory module;

mapping a sender address to a dedicated input line on a pattern register;

performing a bit-matching between said sender address and an internally stored bit pattern; and overwriting an existing entry such that a least-energy-dissipating link is over-written first when a new input address is present.

16. The system of claim 15 wherein said plurality of hardware cores is capable of representing said at least one core.

17. The system of claim 15 wherein said sub-modules interact to evolve said at least one logic pathway.

18. The system of claim 15 further comprising a flow network created between a senor input and a sink event.

19. The system of claim 18 wherein said sink event comprises a prediction of said sensor input.

20. The system of claim 15 wherein:

said sub-modules interact to evolve said at least one logic pathway; and a flow network created between a senor input and a sink event.

* * * * *